United States Patent [19]

Aubert et al.

[11] 4,364,899

[45] Dec. 21, 1982

[54] ASSEMBLY FOR PASSAGE THROUGH A CONTAINMENT SLAB FOR TRANSFERRING IRRADIATED NUCLEAR FUEL

[75] Inventors: Michel Aubert, Manosque; Antoine Bret, Aix en Provence, both of France

[73] Assignee: Commissariat a l'Energie Atomique, Paris, France

[21] Appl. No.: 178,290

[22] Filed: Aug. 15, 1980

[30] Foreign Application Priority Data

Aug. 30, 1979 [FR] France .............................. 79 21762

[51] Int. Cl.³ .......................................... G21C 19/00
[52] U.S. Cl. .................................. 376/264; 376/270; 376/271
[58] Field of Search .............. 376/264, 268, 269, 270, 376/271

[56] References Cited

U.S. PATENT DOCUMENTS 3,915,792 10/1975 Aubert .............................. 376/270
4,202,728 5/1980 Allain .............................. 376/270
4,202,729 5/1980 Allain .............................. 376/270

FOREIGN PATENT DOCUMENTS 1247096 10/1960 France .............................. 376/270
916820 1/1963 United Kingdom ................ 376/270

*Primary Examiner*—Donald P. Walsh
*Attorney, Agent, or Firm*—Pearne, Gordon, Sessions, McCoy & Granger

[57] ABSTRACT

The invention relates to an assembly for passage through a containment slab for transferring irradiated nuclear fuel, comprising a sleeve passing through the slab and fast therewith and a guide ramp passing through the sleeve and in which moves a handling pot carrying the fuel, wherein said assembly further comprises a device for evacuating the residual heat dissipated by the fuel, this device comprising a bundle of caloducts disposed parallel to the ramp over a length at least equal to that of the sleeve, and means for evacuating the flow of heat directed above the slab by the caloducts.

11 Claims, 9 Drawing Figures

ASSEMBLY FOR PASSAGE THROUGH A CONTAINMENT SLAB FOR TRANSFERRING IRRADIATED NUCLEAR FUEL

The invention relates to an assembly for passage through a containment slab, for transferring irradiated nuclear fuel between, in particular, the vessel containing the core of a fast neutron nuclear reactor and a zone for storage of the irradiated nuclear fuels disposed outside the vessel.

In fast neutron nuclear reactors, the fuel is generally disposed inside cladded pins disposed in a bundle in elongated receptacles constituting assemblies provided with a gripping head allowing handling thereof. In the course of this handling, and in particular when an irradiated assembly is replaced in the core of the reactor by a new assembly, the irradiated assembly is extracted from the core by means of a grab and transferred to a handling pot placed on the periphery of the core, at the base of an inclined guide ramp allowing the irradiated assembly to be guided up to a pivoting hood element disposed above the slab of the vessel of the reactor. A second inclined guide ramp, which opens out into the pivoting hood element, enables the irradiated assembly to be guided into an outside storage receptacle contiguous with the vessel of the reactor and closed by a slab extending the slab of the vessel of the reactor.

The irradiated assembly is then extracted from the handling pot and placed in a cavity where it loses part of its activity, before being introduced into a tight case and enclosed in a shielded cask enabling it to be transported up to a reprocessing centre.

In heretofore known solutions, after it has been extracted from the core of the reactor, the irradiated assembly is stored for a certain length of time inside the vessel itself before being taken out of the containment. However, this process has the drawback of substantially increasing the volume of the vessel and of lengthening the duration of immobilisation of the irradiated assembly and, consequently, the cycle of the fuel. To remedy these drawbacks, French Pat. No. 73 23506, filed on June 27, 1973 in the name of Commissariat à l'Energie Atomique for "Process for handling irradiated fuel assemblies in a fast neutron reactor and installation for carrying out this process", proposes to transfer the irradiated assembly into the storage receptacle outside the vessel of the reactor as soon as this assembly is extracted from the core, the handling pot in which the assembly is placed during transport being arranged so as to evacuate the calories released by this assembly.

When the irradiated assemblies are transferred directly from the vessel of the reactor into the storage receptacle, the energy dissipated by these assemblies is considerable. It is therefore necessary to provide the evacuation of this energy in the case of the handling pot being blocked in the passages through the containment slabs of the vessel of the reactor and of the storage receptacle.

It is an object of the present invention to provide an assembly for passage through these slabs enabling the residual power of the irradiated assembly contained in the handling pot to be evacuated, even if the latter is accidentally blocked in the passage through a slab.

To this end, and in accordance with the invention, an assembly for passage through a containment slab for transferring irradiated nuclear fuel, is proposed, comprising a sleeve fast with and passing through the slab and a guide ramp passing through the sleeve and in which a handling pot carrying the fuel moves, said assembly being characterised in that it further comprises a device for evacuating the residual heat dissipated by the fuel, this device comprising a bundle of tubes carrying the heat transfer fluid, hereinafter called "caloducts", disposed parallel to the ramp over a length at least equal to that of the sleeve and means for evacuating the flow of heat directed above the slab by the caloducts.

According to a preferred embodiment of the invention, the means for evacuating the flow of heat directed above the slab by the caloducts comprise an annular calandria in which a cooling fluid circulates, the bundle of caloducts extending inside said calandria. In order to promote the exchange of heat between the heat-transfer fluid contained in the caloducts and the cooling fluid circulating in the calandria, the part of each of the caloducts disposed inside the calandria preferably comprises cooling fins.

Moreover, a helical baffle may be disposed in the calandria between an inlet orifice and an outlet orifice for the cooling fluid in order to improve the circulation of the cooling fluid inside the calandria.

According to a first variant of the invention, the caloducts are disposed in the annular space defined between the sleeve and the ramp. The caloducts are then preferably distributed around the ramp opposite holes made therein. In addition, the device for evacuating the residual heat dissipated by the fuel and the guide ramp may be dismountable independently of each other, this facilitating inspection and maintenance of the different parts of the passage assembly.

According to a second variant of the invention, the caloducts are disposed inside the guide ramp, on either side of the handling pot. The part of the ramp disposed inside the calandria may then be provided with at least one removable element, the device for evacuating the residual heat dissipated by the fuel being dismountable after removal of said element, and the guide ramp being dismountable after this device has been removed.

According to another feature of the invention, means are provided for ensuring the radial positioning of the caloducts with respect to the ramp, whilst allowing their relative displacement in a direction parallel to the axis of the ramp. This feature enables the differential expansions to be taken into account and allows the different parts of the assembly to be dismantled.

According to yet another feature of the invention, the heat-transfer fluid contained in the caloducts is mercury.

The invention will be more readily understood on reading the following description with reference to the accompanying drawings, in which.

Figure 2A:
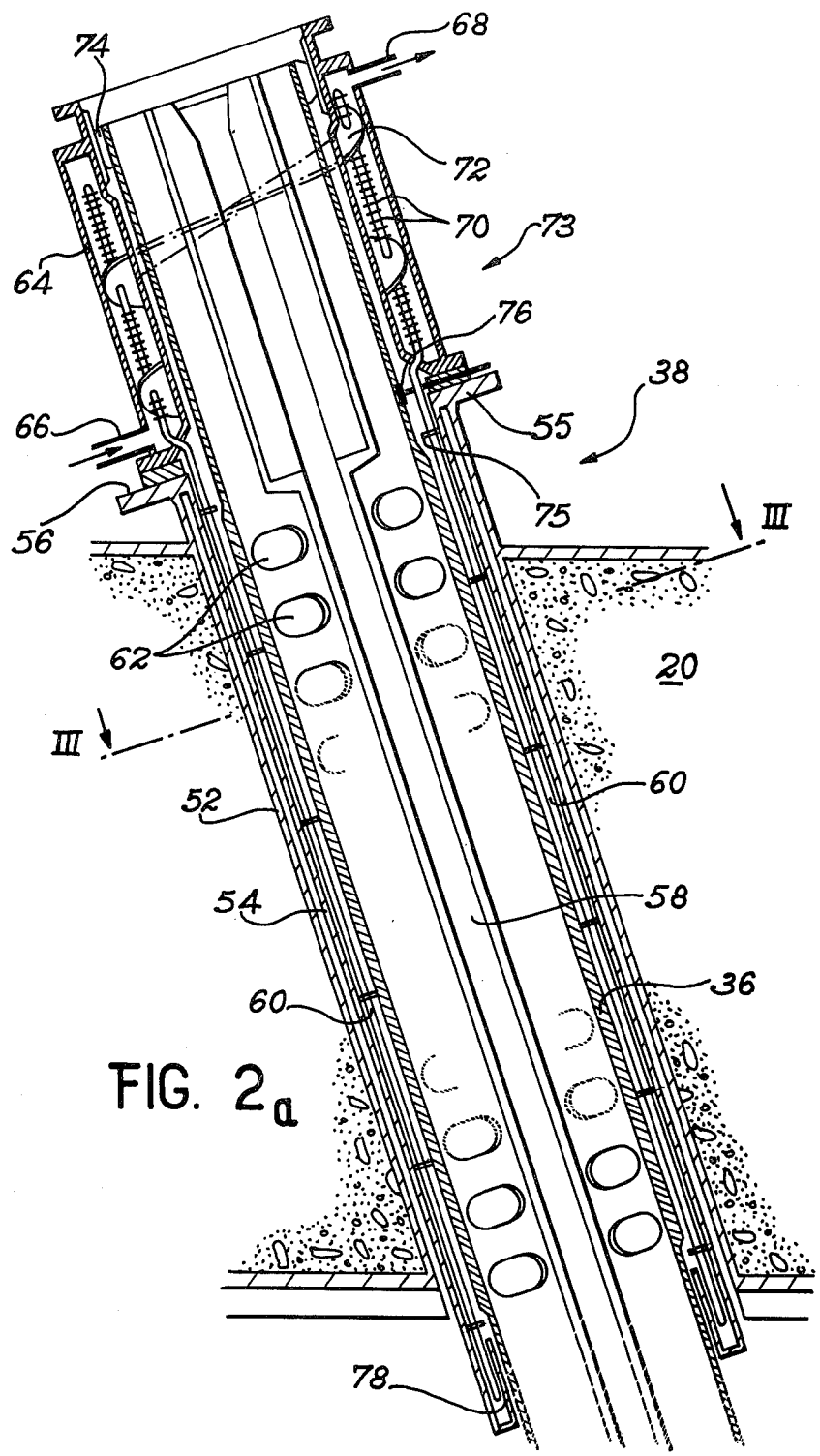
FIG. 2a is an enlarged view in longitudinal section of one of the slab passage assemblies shown in FIG. 1, illustrating a first variant embodiment of the invention.
Figure 2B:
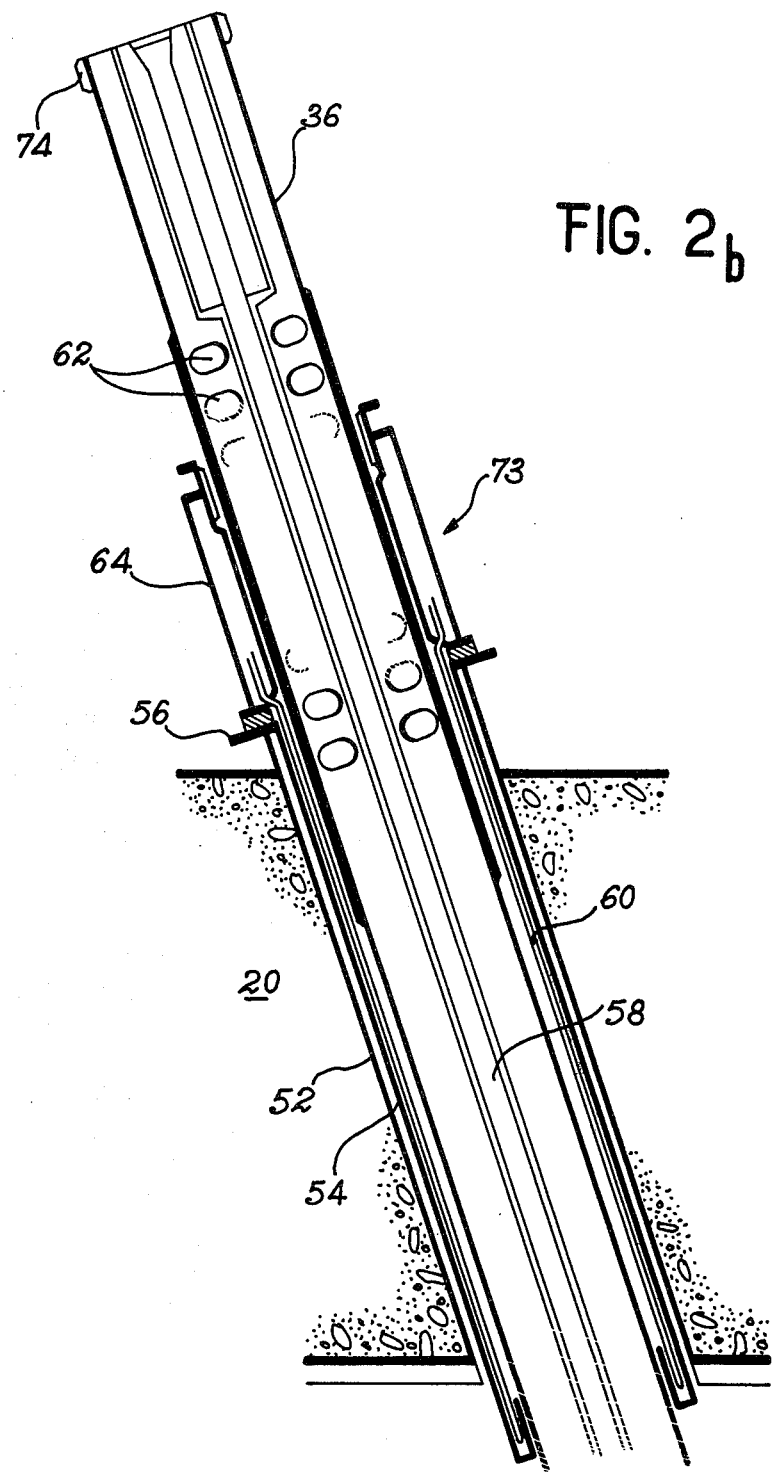
Figure 2C:
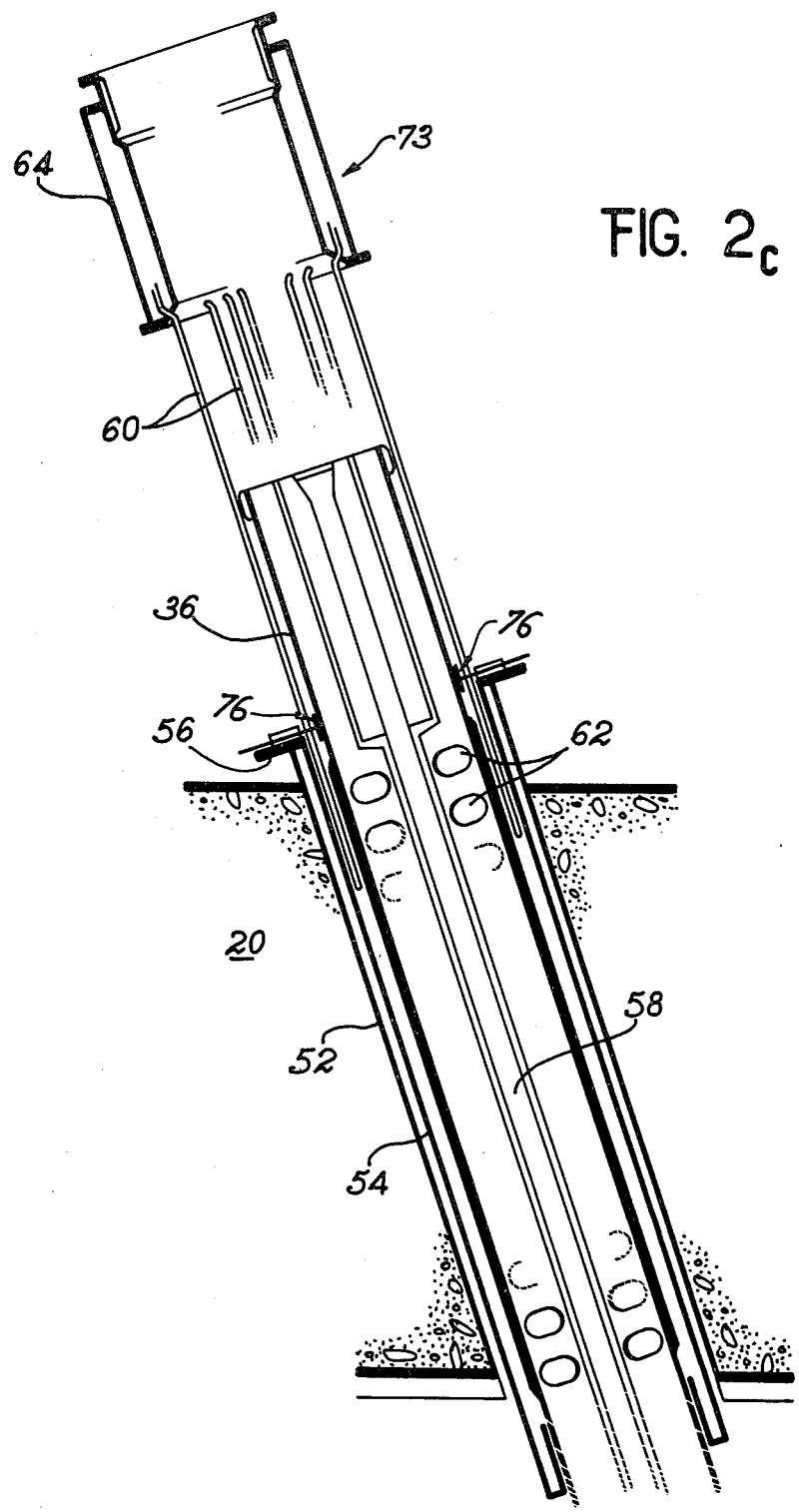

FIGS. 2b and 2c respectively schematically illustrate the dismantling of the ramp and the heat evacuation device in the variant shown in FIG. 2a.

Figure 3:
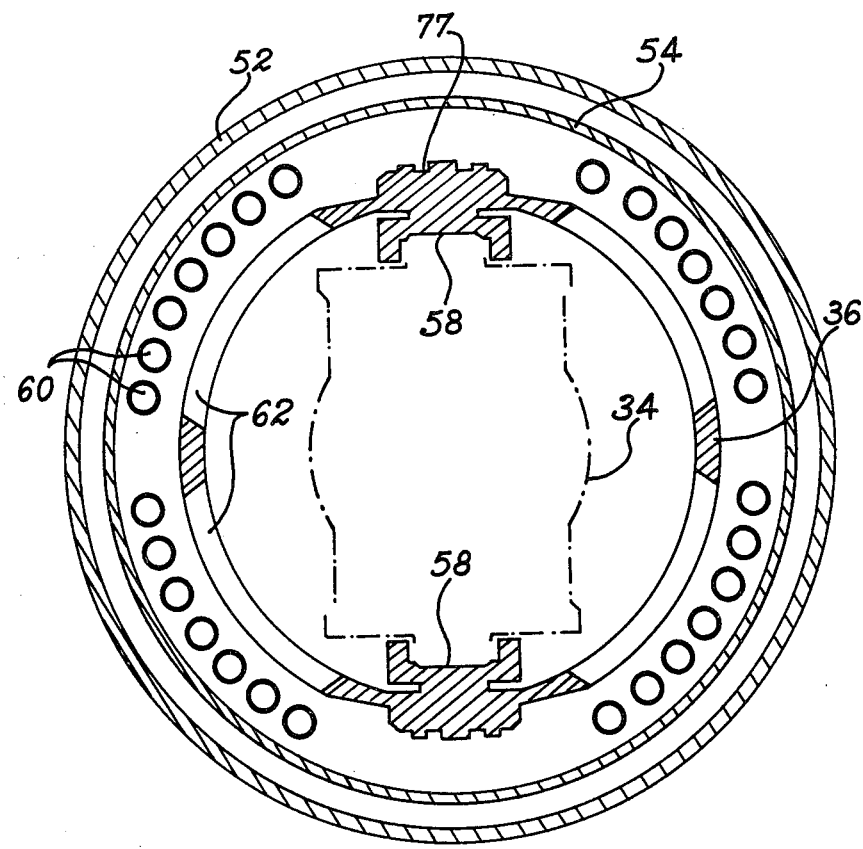

FIG. 3 is a view in section along line III—III of FIG. 2a, on a larger scale.

Figure 4A:
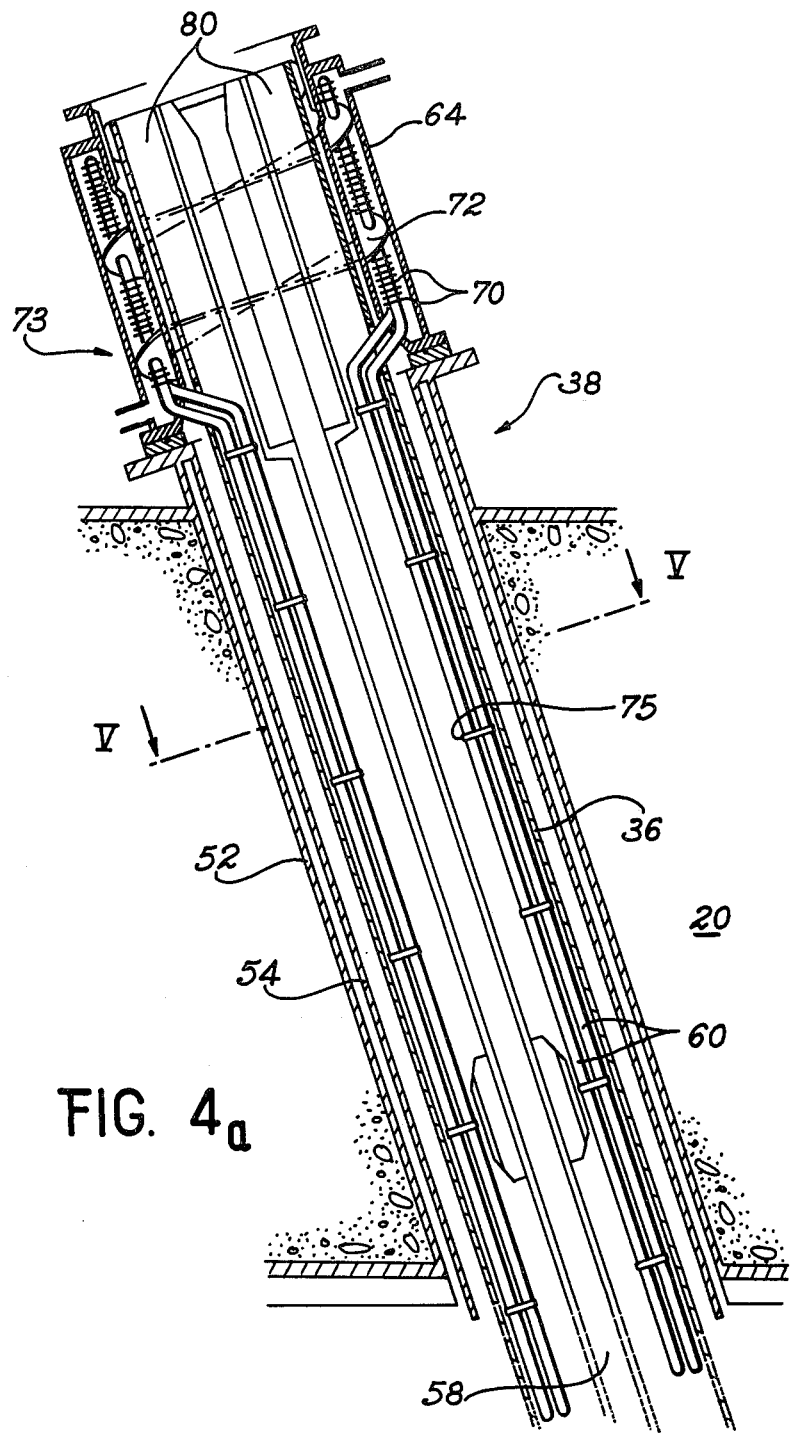

FIG. 4a is a view in longitudinal section, comparable with FIG. 2a, illustrating a second variant embodiment of an assembly for passage through a containment slab according to the invention.

Figure 4B:
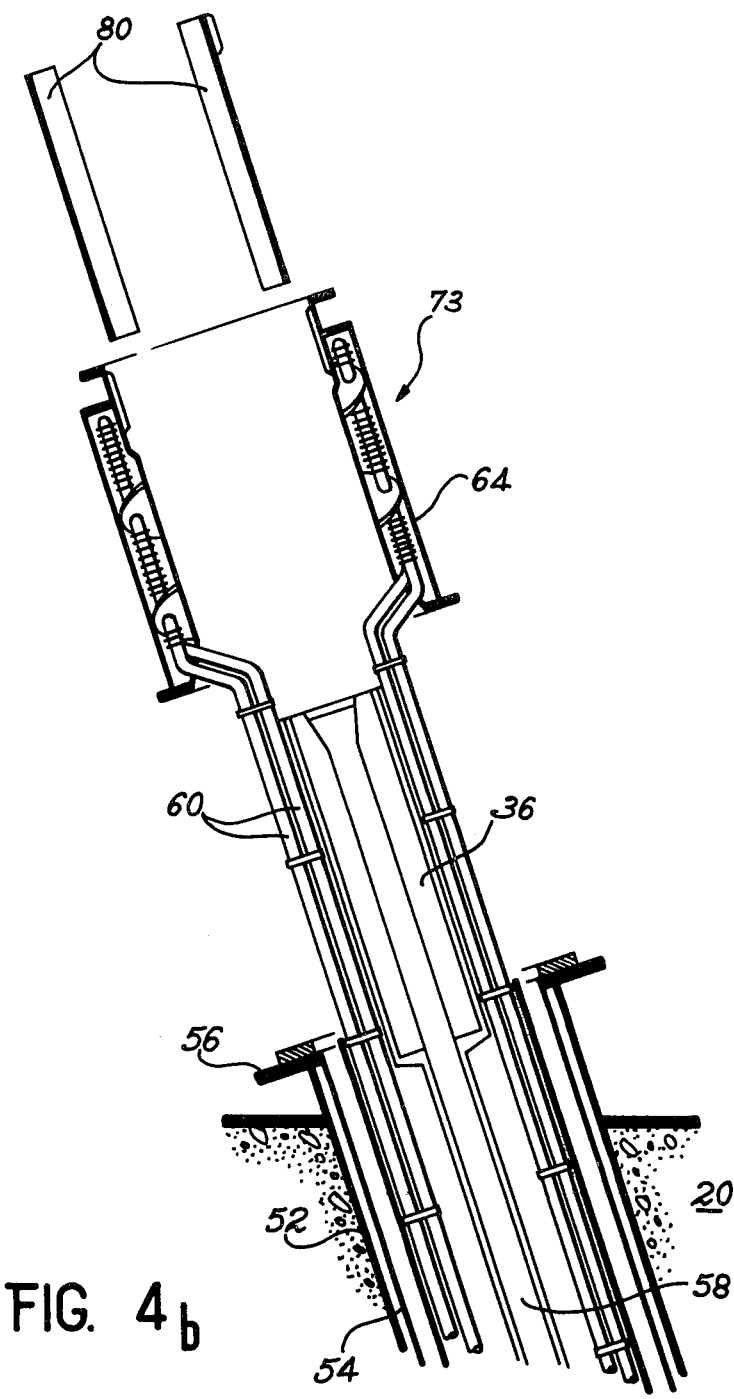

FIG. 4b schematically illustrates the dismantling of the heat evacuation device, then of the ramp, according to a first embodiment of the variant shown in FIG. 4a.

Figure 5:
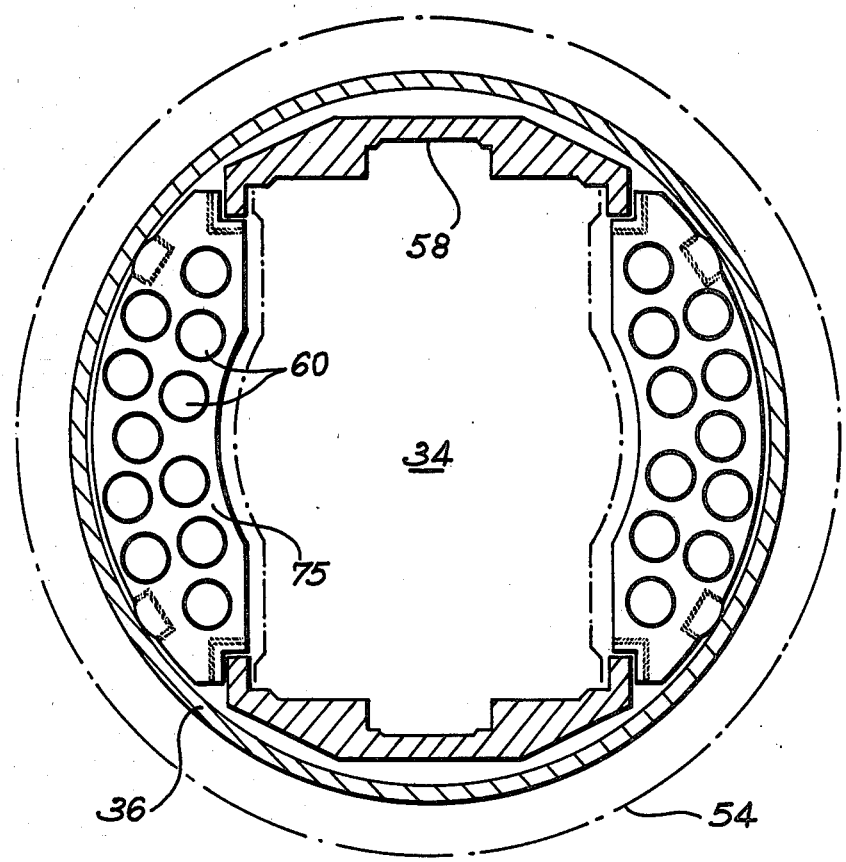

FIG. 5 is a view in section along line V—V of FIG. 4a, and

Figure 6:
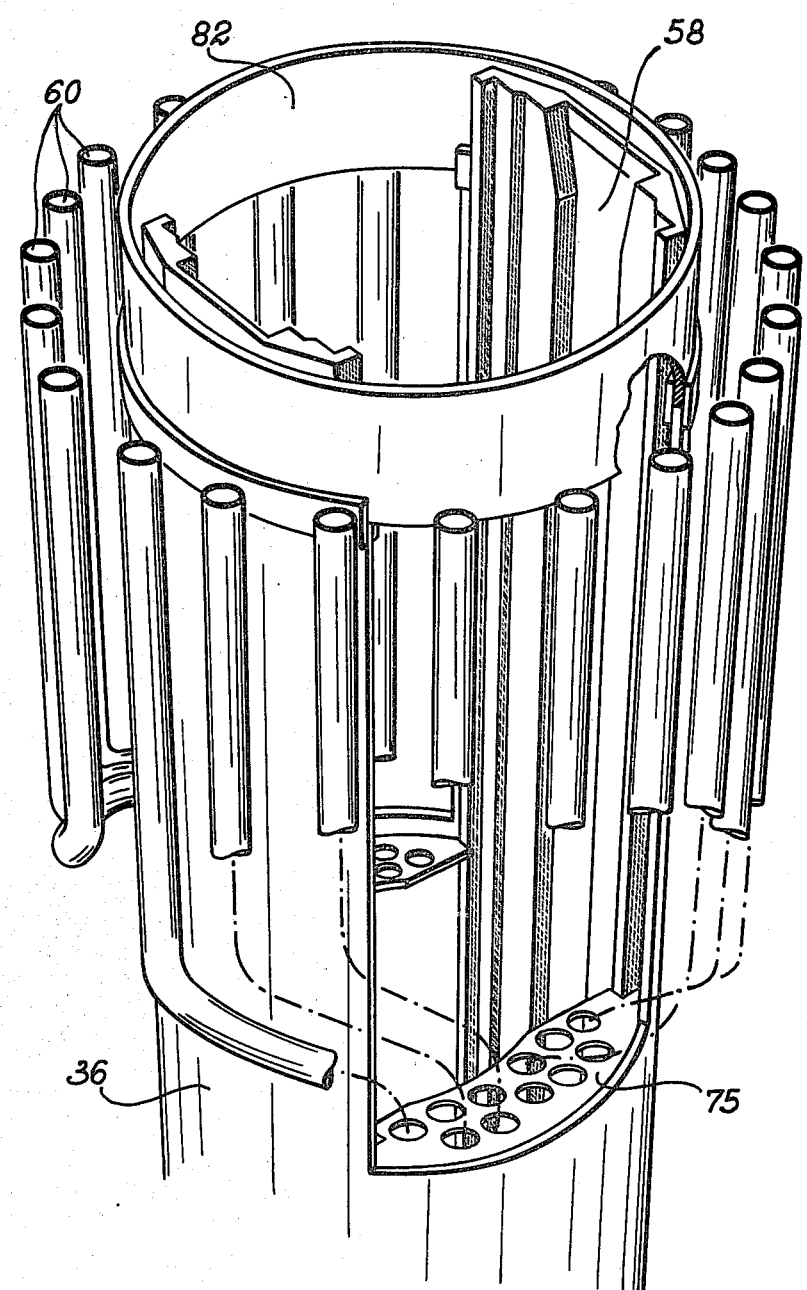

FIG. 6 is a view in perspective of the upper end of an assembly for passage through a containment slab of the variant shown in FIG. 4a, illustrating a second embodiment of the invention.

Figure 1:
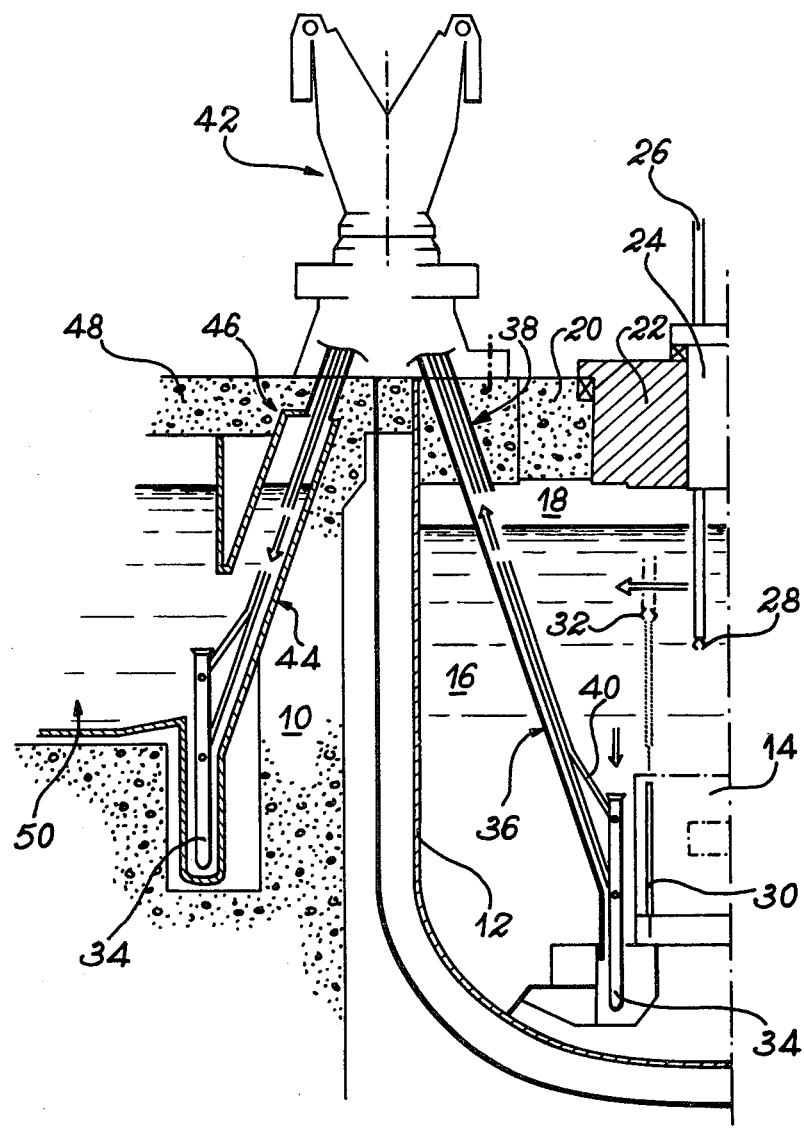
FIG. 1 is a schematic view in transverse section of an installation for transferring an irradiated assembly from the core of a nuclear reactor to an outside storage receptacle.

Referring now to the drawings, reference 10 in FIG. 1 designates a thick-walled enclosure, generally made of concrete, internally defining an open cavity, generally cylindrical in form and with vertical axis, in which the vessel 12 of a fast neutron nuclear reactor is mounted. The core 14 of this reactor, disposed inside the vessel 12, is immersed in a liquid cooling metal 16, such as sodium, surmounted by a layer 18 of an inert gas such as argon. The upper part of the vessel 12 is suspended from a horizontal slab 20 closing the enclosure 10.

The slab 20 comprises different orifices for passage allowing access to inside the vessel, and in particular a circular opening in which is mounted an assembly constituted by two turning plugs 22 and 24 eccentric with respect to each other so that the combined rotations of these two plugs allow a handling member 26 passing through the plug 24 to be positioned vertically with respect to any point of the core 14. The member 26 comprises at its lower end located in the vessel 12 a grab 28 adapted to seize the handling head 32 of each of the assemblies 30 which constitute the core 14.

Each assembly 30 is formed by an outer casing containing a bundle of cladded pins containing the nuclear fuel, and it is disposed vertically in the core 14. The grab 28 enables each assembly to be extracted from the core of the reactor and to be transferred in a handling pot 34 disposed on the periphery of the core, whilst maintaining it in the liquid sodium 16 contained in the vessel. The handling pot 34 may move on an inclined guide ramp 36 immersed inside the vessel 12 and passing through the closure slab 20 via a passage assembly 38 of which different variants will be described in greater detail hereinafter with reference to FIGS. 2 to 6. The pot 34, made for example in accordance with the provisions described and claimed in French Pat. No. 77 02147 filed on Jan. 26, 1977 in the name of Commissariat à l'Energie Atomique for "Handling pot for a fuel assembly", is guided in the axis of the ramp 36 due to a stirrup system 40.

The irradiated assembly 30 placed in the pot 34 is displaced along the inclined ramp 36 through the passage assembly 38 to be taken out of the vessel 12 and into a pivoting hood element 42, for example by means of a winch (not shown). The pivoting hood element 42 is made for example in accordance with the provisions described and claimed in French Pat. No. 72 20634 filed on June 8, 1972 in the name of Commissariat à l'Energie Atomique for "Transfer hood element". (See U.S. Pat. No. 3,915,792) The pivoting hood element 42 is preferably equipped with a ventilation circuit enabling the residual power of the irradiated assembly to be evacuated when the latter is inside the hood element.

The pivoting hood element 42 is designed to rotate the handling pot containing the fuel assembly through 180°, bringing it opposite a second inclined ramp 44. The ramp 44, via a passage assembly 46 which may be identical to the passage assembly 38, passes through a slab 48 closing a storage receptacle 50 contiguous with the vessel 12 of the reactor, so that the slab 48 is disposed in line with the slab 20. The storage receptacle 50 is filled with liquid metal and it contains a rotating drum (not shown) adapted to receive the irradiated assembly 30 after it has been extracted from the handling pot 34 by means of a handling member equipped with a grab (not shown) of the same type as member 26 and grab 28.

A first variant embodiment of the slab passage assembly 38 will now be described with reference to FIGS. 2a and 3, it being understood that the slab passage assembly 46 is identical to assembly 38 and will not be described separately.

As illustrated in particular in FIG. 2a, the assembly 38 for passage through the containment slab 20 of the vessel of the reactor comprises a sleeve 52 passing through and fast with the slab 20 and in which is disposed a thermal lining 54 carried by the sleeve 52 and spaced therefrom so as to define an annular space communicating with the vessel of the reactor. The sleeve 52 and the lining 54 form above the slab 20 a flange 55 on which a support surface 56 is provided.

The sleeve 52 and lining 54 define in the slab 20 a passage through which the guide ramp 36 freely passes, the latter being provided in a plane normal to the plane of section of FIG. 2a with two guide rails 58 on which rollers (not shown) roll, which may be mounted either on a carriage carrying the handling pot 34, or directly on the latter.

In accordance with the present invention and according to a first variant embodiment, shown in FIGS. 2a and 3, a bundle of caloducts 60 is disposed in the annular space defined between the lining 54 and the ramp 36 parallel to the axis thereof and over the whole length of the sleeve 52. More precisely, and as illustrated in particular in FIG. 3, the caloducts 60 are disposed in four groups regularly distributed around the ramp 36 opposite holes 62 made therein, in order to allow the major part of the heat dissipated by an irradiated assembly, accidentally blocked in the sleeve 52, to reach the caloducts 60. By way of illustration, it will be noted for example that either thirty six caloducts whose outer diameter is about 33.4 mm, or twenty eight caloducts whose outer diameter is about 48.3 mm (variant shown in FIG. 3) may thus be disposed between the ramp 36 and the lining 54.

As illustrated in FIG. 2a, the caloducts 60 extend upwardly beyond the sleeve 52 inside an annular calandria 64 in which a cooling fluid such as air circulates between a lower inlet orifice 66 and an upper outlet orifice 68. The annular calandria 64 thus enables the flow of heat directed above the slab 20 by the caloducts 60 to be evacuated. In order to improve the heat exchanges between the caloducts 60 and the cooling fluid circulating in the calandria 64, the part of each of the caloducts disposed inside the calandria comprises radial cooling fins 70. In addition, the circulation of the cooling fluid between the inlet orifice 66 and the outlet orifice 68 is improved by the presence of a helical baffle 72 inside the calandria 64. The circulation of the cooling fluid inside the calandria 64 between the inlet orifice 66 and the outlet orifice 68 may come either from a circuit under pressure connected in parallel to the ventilation circuit of the pivoting hood element 42, or from natural convection, the calandria 64 then being connected to the depression created by a chimney. In both cases, this circulation may be controlled by maneuvering two valves (not shown) located respectively at inlet orifice 66 and outlet orifice 68.

Each of the caloducts 60 is, in known manner, closed and filled with a heat-transfer fluid which is in liquid phase in the lower part of the caloducts and in gaseous phase in the top part of the caloducts, i.e. inside the calandria 64, so as to define an evaporation zone and a condensation zone respectively. The heat-transfer fluid is chosen as a function of the conditions of functioning imposed on the caloducts, and particularly as a function of the range of temperature in which it must operate, its vapour pressure and the flow of heat to be transferred. Taking into account these different elements, the heat-transfer fluid contained in the caloducts will preferably be constituted by mercury.

The assembly constituted by the caloducts 60 and by the annular calandria 64 and its cooling system constitute a device 73 for evacuating the residual heat dissipated by an irradiated fuel assembly disposed in a handling pot accidentally blocked in the sleeve 52.

As illustrated in particular in FIG. 2a, the annular calandria 64 rests on the support surface 56 defined on the sleeve 52 and lining 54, and the caloducts 60 are positioned radially between the ramp 36 and the lining 54 by baffles 75 fast with the caloducts and regularly distributed over the whole length of the sleeve 52. These baffles maintain the spacing between the caloducts whilst allowing each group of caloducts to expand independently of the ramp. At least one of the baffles 75, disposed in the lower part of the sleeve 52, ensures a sliding support of the bundle of caloducts 60, via two guides 77 (FIG. 3). This arrangement enables the bundle to expand transversely and to follow the variations of the diameter of the ramp 36, whatever its inclination. Furthermore, at nominal rating i.e. during normal functioning of the reactor, the baffles 75 limit the movements of convection of the argon 18 contained in the vessel 12. This results in a reduction of the transfer of heat through the sleeve 52-lining 54 assembly. Finally, this structure allows the heat evacuation device 73 and the guide ramp 36 to be dismantled independently of each other as will be seen hereinafter.

The centering of the top part of the ramp 36 with respect to the calandria 64 is ensured by slide blocks 74 associated with the top end of the ramp and cooperating with suitable surfaces formed inside the calandria. Finally, the lining 54 termines in its low part in a baffle 78 enveloping the lower end of the caloducts 60.

When a handling pot 34 containing an irradiated assembly which has just been extracted from the core of the reactor is accidentally blocked inside the passage assembly 38 or the passage assembly 46, the heat dissipated by the nuclear fuel passes through the handling pot and reaches the caloducts 60 by passing through the holes 62 made in the ramp 36. The heating of the heat-transfer fluid such as mercury contained in the caloducts, which is in the liquid state at passage through the slab 20, leads to an evaporation of this liquid which is thus converted into gas in the top part of each of the caloducts disposed inside the calandria 64. The vaporized heat-transfer fluid contained in the caloducts 60 inside the annular calandria 64 is then cooled by the cooling fluid circulating between the inlet orifice 66 and the outlet orifice 68 of the calandria; this cooling action of the fluid circulating in the calandria 64 is accelerated by the radial fins 70 and by the helical baffle 72. This results in a condensation of the heat-transfer fluid inside the calandria 64. A balance is thus established between the liquid phase and the vapour phase of the heat-transfer fluid contained in the caloducts, so that the heat dissipated by the fuel assembly contained in a handling pot which might be accidentally blocked in the passage through the slab is regularly transferred above the slab via the caloducts, then evacuated by the cooling fluid circulating in the calandria 64. The temperature prevailing in the sleeve 52 is thus stabilised at a suitable level.

Although the operational conditions of the caloducts in normal running are not very erosive, it is necessary to inspect and maintain the different parts of the passage assembly according to the invention. As illustrated in FIGS. 2b and 2c respectively, the guide ramp 36 and the heat evacuation device 73 are dismountable independently of each other in this first variant embodiment of the invention.

The operations for dismantling the ramp 36 or the device 73 must be preceded by a partial dismantling of the pivoting hood element 42 and by the positioning of a discharging device on the support surface 56 formed on the flange 55. As illustrated in FIG. 2b, the guide ramp 36 may then be dismantled independently of the heat evacuation device. Similarly, and as illustrated in FIG. 2c, the heat evacuation device 73 constituted by the caloducts 60 and the annular calandria 64 may also be dismantled, the ramp 36 remaining in place and being maintained along three generatrices by three retractable members such as 76, for example with screws.

It will be noted that the passage assembly which has just been described makes it possible to modify neither the geometry nor the technology of the existing guide ramps, whilst disposing the cold source constituted by the calandria 64 through which a cooling fluid passes, in the immediate proximity of the passage through the slab 20, i.e. of the handling pot when the latter is blocked in this passage. In addition, the cooling device may be withdrawn independently without having to intervene on the ramp.

At nominal rating, i.e. in the course of normal functioning of the reactor and when the circulation of air inside the calandria is completely stopped, the caloducts 60, subjected to a radial flow of heat from inside the passage to outside, ensure a homogenisation of the temperature along this passage and thus allow a limitation of the temperature of the sleeve 52. This feature makes it possible to envisage, in a variant which has not been shown, the elimination of the thermal lining 54, the caloducts 60 then being disposed directly between the sleeve 52 and the ramp 36.

FIGS. 4a and 5 show a variant embodiment of the passage assembly shown in FIGS. 2a and 3, in which, instead of being disposed in the annular space defined between the ramp 36 and the sleeve 52, the caloducts 60 are disposed inside the guide ramp 36 and on either side of the handling pot 34. This solution is thermally more effective than the preceding one, since the caloducts are disposed in the immediate vicinity of the handling pot, and it enables the holes in the guide ramp to be eliminated, this enabling the thickness of the wall thereof to be reduced and leading to a certain decrease in the radial dimensions of the assembly at the passage through the slab 20. Due to this arrangement and by way of illustration, it will be noted that it is possible to dispose inside the ramp 36 either two groups of eleven caloducts whose outer diameter is about 48.4 mm (variant shown in FIG. 5), or two groups of twenty caloducts whose outer diameter is about 33.4 mm.

The variant embodiment shown in FIGS. 4a and 5 has, however, the drawback that, as the annular calandria 64 remains unchanged with respect to the variant shown in FIG. 2a, the caloducts 60 must pass through the ramp 36 near the upper end of the sleeve 52. Consequently, to effect the dismantling of the heat evacuation device 73 and of the guide ramp 36, it is necessary to provide in the upper part of this latter at least one dismountable element disposed in line with each of the two groups of caloducts 60.

In a first embodiment, shown in FIG. 4b, of the variant of FIG. 4a, the top part of the ramp 36 comprises two dismountable cylindrical sectors 80 each disposed in line with one of the groups of caloducts 60 and of which the dismantling firstly allows the dismantling of the heat evacuation device 73 comprising the caloducts 60 and the annular calandria 64 and then the dismantling of the ramp 36.

In a second embodiment of the invention shown in FIG. 6, the two dismountable panels 80 are replaced by a dismountable ring 82 added to the end of the ramp 36. This solution ensures a better transverse rigidity of the top end of the guide ramp.

In these two embodiments, as illustrated in FIG. 4b, the ramp 36 can be dismounted only after the heat evacuation device 73 has been removed, this removal itself being determined by the dismantling of the panels 80 (first embodiment according to FIG. 4b) or of the ring 82 (second embodiment according to FIG. 6).

The passage assemblies shown in FIGS. 4a and 5 and in FIG. 6 function identically to the passage assembly shown in FIGS. 2a and 3, and this will not be described again.

Of course, the invention is not limited to the embodiments which have just been described by way of example, but covers all the variants thereof. It will be understood that such an assembly may be used each time a handling pot containing an irradiated assembly must pass through a containment slab whatever the path followed by this handling pot and even if this path is substantially different from the one shown by way of example in FIG. 1. Similarly, it is of little importance whether the handling pot containing the irradiated assemblies is guided directly inside the ramp passing through the slab or whether it is placed inside a carriage ensuring displacement along the ramp.

We claim:

1. In an assembly for passage through a containment slab for transferring irradiated nuclear fuel, comprising a sleeve passing through and fast with the slab and a guide ramp passing through the sleeve and in which moves a handling pot carrying the fuel, a device is provided for evacuating the residual heat dissipated by the fuel, said device comprising a bundle of tubular caloducts disposed parallel to said ramp and extending over a length at least equal to that of said sleeve, each tubular caloduct being closed and filled with a heat-transfer fluid which is in liquid phase in a lower part of the caloduct and in gaseous phase in a top part of the caloduct, said device further comprising a cooling fluid circulating at least by natural convection around said top part of the caloducts, said top part of said caloducts being located above said slab.

2. The slab passage assembly of claim 1, including an annular calandria containing said top part of the caloducts, the cooling fluid circulating through the calandria to cool said top parts.

3. The slab passage assembly of claim 2, wherein the said top part of each of the caloducts disposed inside said calandria comprises cooling fins.

4. The slab passage assembly of claim 2, wherein a helical baffle is disposed in the calandria between an inlet orifice and an outlet orifice for the cooling fluid.

5. The slab passage assembly of claim 1, wherein the caloducts are disposed in the annular space defined between the sleeve and the ramp.

6. The slab passage assembly of claim 5, wherein the caloducts are distributed about the ramp opposite holes made therein.

7. The slab passage assembly of claim 5, wherein the device for evacuating the residual heat dissipated by the fuel and the guide ramp are dismountable independently of each other.

8. The slab passage assembly of claim 2, wherein the caloducts are disposed inside the guide ramp, on either side of the handling pot.

9. The slab passage assembly of claim 8 wherein the part of the guide ramp disposed inside the said calandria is provided with at least one removable element, the device for evacuating the residual heat dissipated by the fuel being dismountable after said element is removed, and the guide ramp being dismountable after this device has been removed.

10. The slab passage assembly of claim 1, wherein means are provided to ensure the radial positioning of the caloducts with respect to the ramp whilst allowing their relative displacement in a direction parallel to the axis of the ramp.

11. The slab passage assembly of claim 1, wherein the heat-transfer fluid contained in the caloducts is mercury.

* * * * *